US005643120A

United States Patent [19]
Murashima et al.

[11] Patent Number: 5,643,120
[45] Date of Patent: Jul. 1, 1997

[54] MOTOR DRIVE SYSTEM

[75] Inventors: Nobuharu Murashima, Nara; Junichi Tanii, Izumi; Yoshito Konishi, Sakai; Ken Tanino, Kobe, all of Japan

[73] Assignee: Minolta Co., Ltd., Osaki, Japan

[21] Appl. No.: 740,072

[22] Filed: Oct. 24, 1996

Related U.S. Application Data

[63] Continuation of Ser. No. 309,650, Sep. 21, 1994, abandoned.

[30] Foreign Application Priority Data

Sep. 30, 1993 [JP] Japan .................. 5-265474

[51] Int. Cl.$^6$ .................. F16H 1/32; F16H 3/34; F16H 59/14; F16H 59/40
[52] U.S. Cl. .................. 475/5; 74/661; 74/665 B; 74/354
[58] Field of Search .................. 477/3; 74/354, 74/661, 665 B; 475/5

[56] References Cited

U.S. PATENT DOCUMENTS

| | | | |
|---|---|---|---|
| 3,575,621 | 4/1971 | Voland et al. | 74/661 X |
| 3,820,140 | 6/1974 | Umeda . | |
| 4,405,029 | 9/1983 | Hunt | 74/661 X |
| 4,484,871 | 11/1984 | Adman et al. | 74/661 X |
| 4,579,019 | 4/1986 | Gabriele | 475/5 |
| 4,969,000 | 11/1990 | Ohara et al. . | |
| 5,085,071 | 2/1992 | Mizushina et al. | 74/661 X |
| 5,150,630 | 9/1992 | Kida et al. | 74/354 |
| 5,195,600 | 3/1993 | Dorgan | 475/5 X |

FOREIGN PATENT DOCUMENTS

| | | |
|---|---|---|
| 59-144618 | 9/1984 | Japan . |
| 59-144619 | 9/1984 | Japan . |
| 59-164039 | 11/1984 | Japan . |
| 59-170833 | 11/1984 | Japan . |

*Primary Examiner*—Charles A. Marmor
*Assistant Examiner*—Nathan O. Jensen
*Attorney, Agent, or Firm*—Burns, Doane, Swecker & Mathis, LLP

[57] ABSTRACT

A motor drive system is provided with two drive units so that the system may be driven not only by operating one of the drive units but by simultaneously operating both of the drive units in accordance with load condition. Both of the first and second drive units are provided with a motor and a gear reduction mechanism. The output gear of the second drive unit is mounted as a planetary gear of a planetary gear mechanism on the carrier. When the current is supplied simultaneously to both the motor of the first drive unit and to the motor of the second drive unit, the output gear of the first drive unit comes into mesh with the output gear of the second drive unit, combining the output forces of the first and second drive units to drive the load driving shaft. When the use of only the first drive unit is required to drive the load, the motor of the second drive unit is rotated reversely to move the carrier of the planetary gear mechanism to a refuge position, where the output gear of the second drive unit is de-meshed from the output gear of the first drive unit.

13 Claims, 6 Drawing Sheets

MOTOR DRIVE SYSTEM

This application is a continuation, of application Ser. No. 08/309,650, filed Sep. 21, 1994, now abandoned.

BACKGROUND OF THE INVENTION

1. Field of the Invention

This invention relates to a motor drive system and, more particularly, to an electric motor drive system suitable for driving precision machines and so forth.

2. Description of the Related Art

Many a drive system incorporating an electric motor have been used in precision machines such as cameras, in which the motor and a speed reducing mechanism are often combined together into one drive unit and installed in the system to facilitate assembling operation.

To gain higher driving speeds of a motor drive system using such a drive unit, installation of a newly designed drive unit and changes in motor characteristics of the drive unit already designed are contemplated, that is, through a first method of replacing the motor with a low-impedance motor to thereby increase motor output, through a second method of replacing the motor with a larger-size motor in order to provide a greater starting torque and to decrease the reduction ratio of a reduction gear, and through a third method of adopting a core-less motor.

The first method, however, has a drawback that a motor speed increases excessively high, resulting in deteriorated durability if motor impedance is set too low. According to the second method, utilization of a large-sized motor and change of the reduction mechanism are required. And moreover it is impossible to utilize a designed drive unit and it is difficult to improve the whole driving speed range from starting to stopping because of lowered starting and braking characteristics of the motor. Furthermore, according to the third method, the driving speed of the motor in a steady state makes no difference from that of conventional motors despite an increase in transient driving speeds resulting from improved motor starting and braking characteristics, thereby raising the price of the motor and accordingly the cost of commodities using the motor drive system.

SUMMARY

It is a primary object of this invention to provide an improved motor drive system which is capable of driving a load not only with an output of a single driving power source but with a combined output of two driving power sources.

It is another object of this invention to provide a motor driving mechanism which is capable of driving a load by only a single motor driving mechanism and by a combination of two motor driving mechanisms in accordance with torque and driving speed required.

The foregoing objects and other objects and new characteristics of this invention will become more apparent and understandable from the following detailed description taken in conjunction with the accompanying drawings.

DETAILED DESCRIPTION OF THE PREFERRED EMBODIMENTS

Figure 1:
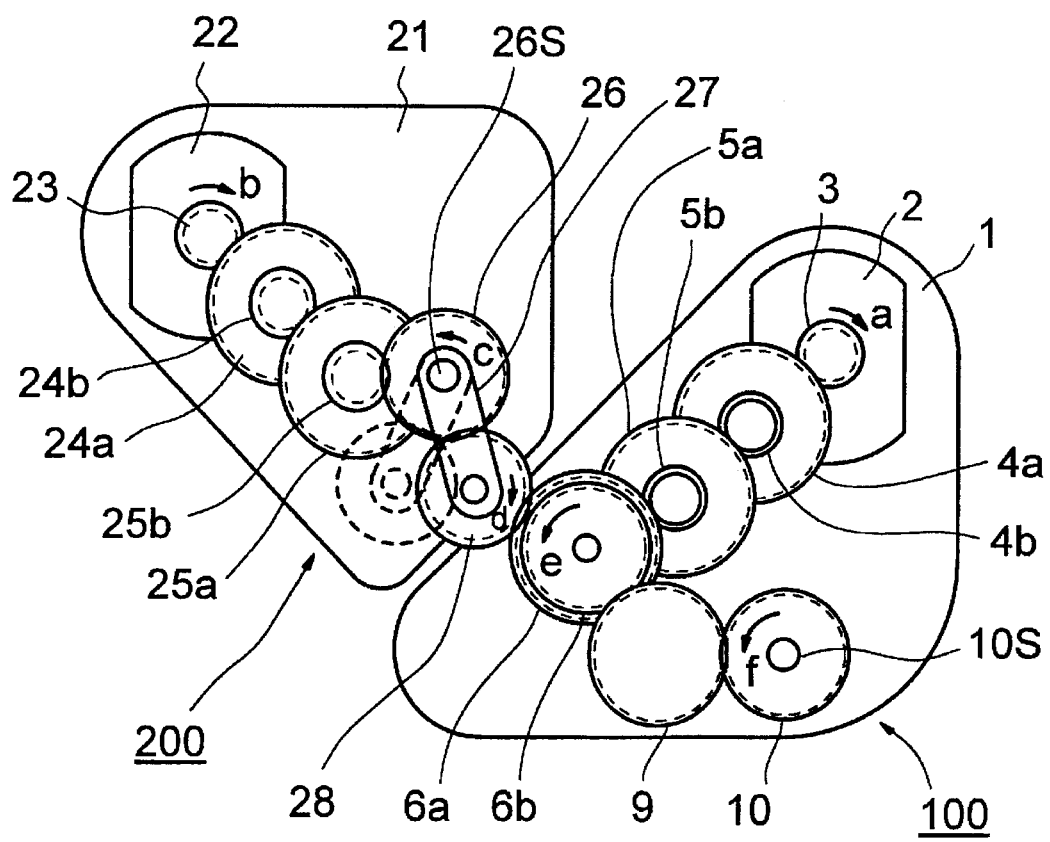
FIG. 1 is a plan view of a gear mechanism in a first embodiment according to this invention.
Figure 2:
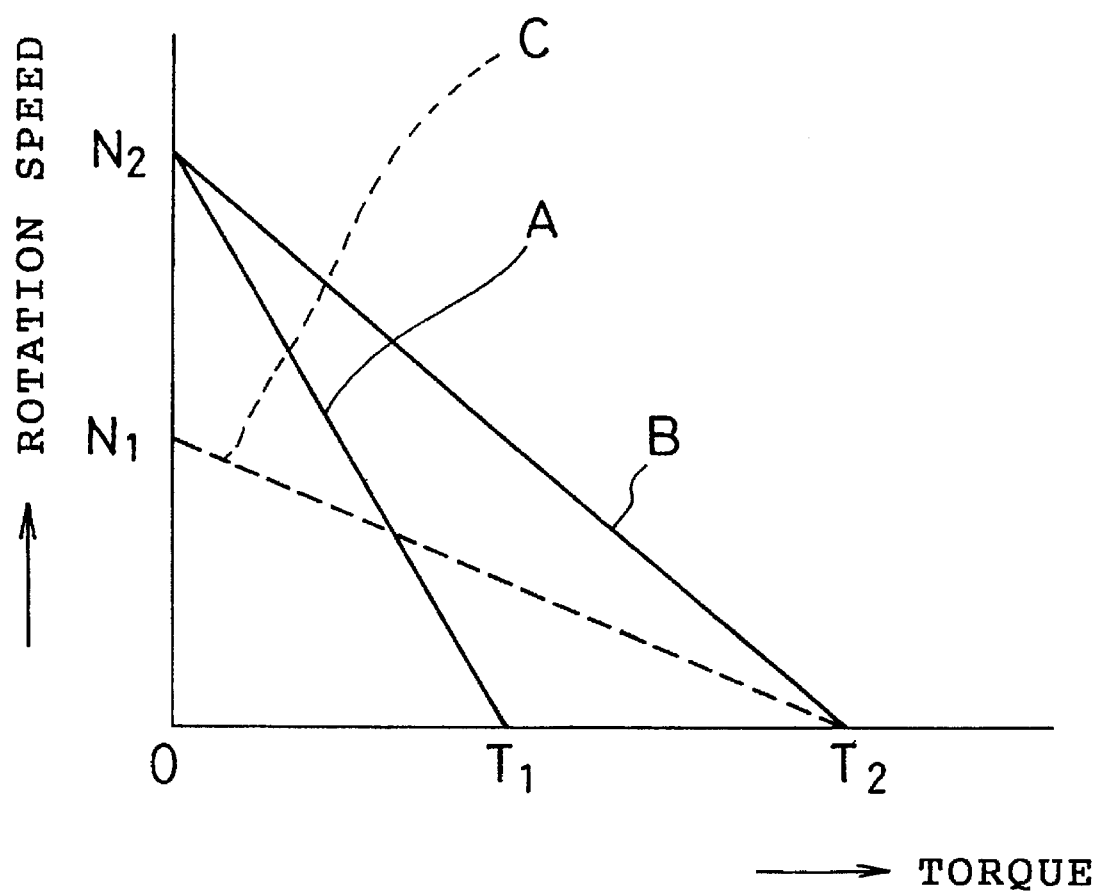
FIG. 2 is an output characteristic diagram showing a relation between a generated torque and speed of a drive unit.
Figure 3:
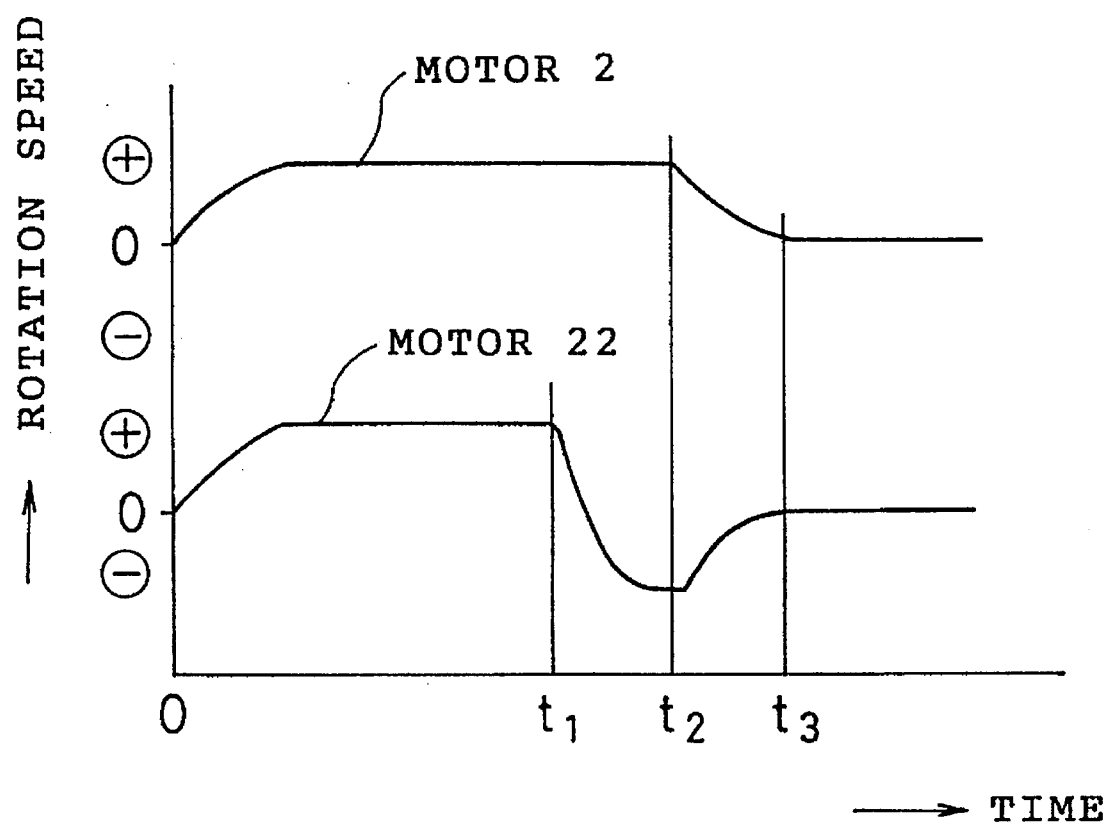
FIG. 3 is a timing chart explaining a driving timing of the drive unit.

Hereinafter exemplary embodiments of a motor drive system according to this invention will be described with reference to the accompanying drawings. FIGS. 1 to 3 show a first embodiment of this invention, wherein FIG. 1 is a plan view showing the constitution of a gear mechanism; FIG. 2 is an output characteristics diagram showing a relation between a generated torque and speed of a drive unit; and FIG. 3 is a timing chart showing the timing of driving the drive unit.

In FIG. 1, a reference numeral 100 refers to a first drive unit, and 200 denotes a second drive unit. A gear 6a of the first drive unit 100 and a gear 28 of the second drive unit 200 are releasably engaged with each other.

An explanation will be given of the first drive unit 100. A reference numeral 1 is a base plate, 2 is a motor, and 3 is a pinion mounted on the driving shaft of the motor 2. A numeral 4a denotes a spur gear which is in mesh with a pinion 3; 4b is a pinion fixedly mounted on the same axis as the spur gear 4a; 5a refers to a spur gear in mesh with the pinion 4b; and 5b represents a pinion fixedly mounted on the same axis as the spur gear 5a. A numeral 6a denotes a spur gear in mesh with the pinion 5b, and 6b is a spur gear fixedly mounted on the same axis as the spur gear 6a. A numeral 9 is an intermediate gear in mesh with the spur gear 6b, and 10 denotes a load driving shaft gear mounted on the load driving shaft 10s, which is a gear in mesh with the intermediate gear 9.

Next explained is a second drive unit 200, in which a reference numeral 21 refers to a base plate; 22 is a motor; and 23 refers to a pinion mounted on the driving shaft of the motor 22. A numeral 24a expresses a spur gear in mesh with the pinion 23; 24b is a pinion fixed on the same axis as the spur gear 24a; 25a is a spur gear in mesh with the pinion 24a; and 25b is a pinion fixed on the same axis as the spur gear 25a.

A reference numeral 26 represents a sun gear in mesh with the pinion 25b; 27 is a carrier rocking about the shaft 26s of the sun gear 26; and 28 refers to a planetary gear rotatably mounted in the vicinity of the forward end of the carrier 27, which is constantly in mesh with the sun gear 26, and also is in mesh with the spur gear 6a of the first drive unit 100 when the carrier 27 is in the solid-line position in FIG. 1 and is out of mesh with the spur gear 6a when the carrier 27 is in the dotted-line position in FIG. 1.

Next, mode of operation of the motor drive system will be explained. First, when the carrier 27 is in the dotted-line position in FIG. 1, the load is driven only by the first drive unit 100. That is, when the current is supplied to the motor 2, the rotation of the motor 2 in the direction of the arrow a is transmitted to the gear 6a through the pinion 3, the spur gear 4a, the pinion 4b, the spur gear 5a and the pinion 5b, thus turning the gear 6a in the direction of the arrow e. The gear 6b fixed coaxially as the gear 6a rotates in the direction of the arrow e; the rotation of this gear 6b is transmitted to the gear 10 through the intermediate gear 9; and the load driving shaft gear 10 mounted on the load driving shaft 10s rotates in the direction of the arrow f, thereby driving the load.

Secondly, when both the motor 2 of the first drive unit 100 and the motor 2 of the second drive unit 200 are supplied with the current, the first drive unit 100 turns the load driving shaft gear 10 mounted on the load driving shaft 10s in the direction of the arrow f to drive the load as previously stated, and furthermore the rotation in the direction of the arrow b of the motor 22 of the second drive unit 200 passes through the pinion 23, the spur gear 24a, the pinion 24b, the spur gear 25a and the pinion 25b, to turn the sun gear 26 in the direction of the arrow c, thus rotating the planetary gear 28 in constant mesh with the sun gear 26 in the direction of the arrow d.

The rotation in the direction of the arrow c of the sun gear 26 moves the carrier 27 to the solid-line position in FIG. 1, thereby moving the planetary gear 28 in constant mesh with the sun gear 26 into mesh with the gear 6a of the first drive unit 100, which therefore will be rotated in the direction of the arrow e.

Consequently, the load driving shaft 10s, receiving a driving force from both the first drive unit 100 and the second drive unit 200, is capable of driving the load at a higher speed than when driven by the first drive unit 100 alone.

When the second drive unit 200 is to be disconnected from the first drive unit 100, the current is supplied in a reverse direction to turn the motor 22 in the opposite direction of the arrow b. The rotation of the motor 22 in the opposite direction of the arrow b rotates the sun gear 26a in the opposite direction of the arrow c through the pinion 23, the spur gear 24a, the pinion 24b, the spur gear 25a and the pinion 25b, thus rotating the planetary gear 28 in the opposite direction of the arrow d.

As a result, the carrier 27 moves as far as the dotted-line position in FIG. 1, where the planetary gear 28 is de-meshed from the gear 6a of the first drive unit 100.

FIG. 2 is an output characteristics diagram showing a relation between the torque produced and speed of the first drive unit 100 and the second drive unit 200 driven separately, and the first and second drive units 100 and 200 driven simultaneously. The first drive unit 100 and the second drive unit 200 have output characteristics as indicated by the line A, where T1 is a starting torque, and N2 is a rotation speed in no-load condition. The first and second drive units driven simultaneously have the output characteristics indicated by the line B, according to which the rotation speed in no-load condition N2 remains unchanged, whereas twice as great a torque T2 as the torque T1, which is great enough to drive the load, is obtainable.

Production of a torque T2 great enough to drive the load only by means of the first drive unit 100 can be attained by increasing the reduction ratio of the first drive unit 100.

Figure 4:
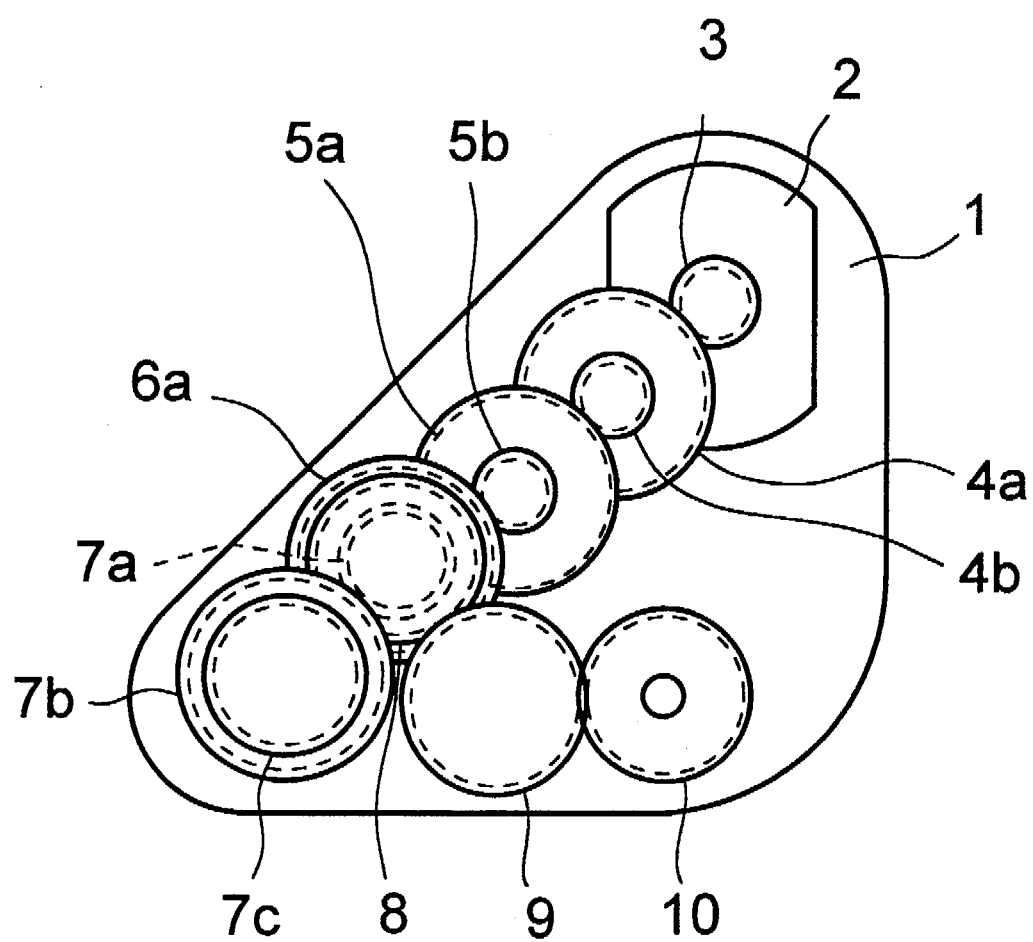
FIG. 4 is a plan view showing the constitution of the drive unit in the first embodiment whose reduction ratio has been increased.

For example, as shown in FIG. 4, a reduction gear mechanism is interposed between the gear 6a and the gear 9. That is, there is added the reduction gear mechanism comprising a gear 7a fixedly mounted on the same axis as the gear 6a, a gear 7b in mesh with the gear 7a, a gear 7c fixedly mounted on the same axis as the gear 7b, and a gear 8 separately mounted on the same axis as the gears 6a and 7a; the gear 8 being meshed with the gear 7c and the intermediate gear 9.

The output characteristics can be improved by reducing the speed to one half by such a means as indicated by the line C in FIG. 2, thereby enabling the generation of the torque T2. However, the rotation speed in no-load condition decreases to N1 which is one half of N2, and can not drive the load at a high speed.

FIG. 3 is a timing chart for driving the first drive unit 100 and the second drive unit 200. In this invention, the first and second drive units, being driven simultaneously, will stop at different positions if a brake is applied simultaneously to the motor of each drive unit. Here, therefore, the final stop position is controlled by one of the two drive unit motors.

In FIG. 3, to stop the motor after a specific amount of rotation, the current is supplied in the reverse direction to the motor 22 of the second drive unit 200 at the time t1 to turn the motor 22 reversely. The sun gear 26 is thus rotated in the opposite direction of the arrow c, and the planetary gear 28 is rotated in the opposite direction of the arrow d; therefore at the time t2 slightly delayed from the time t1 the carrier 27 moves to the dotted-line position in FIG. 1 and the planetary gear 28 is de-meshed from the gear 6a of the first drive unit 100.

Consequently, after the time t2 the load is driven only by the first drive unit 100; therefore the motor 2 of the first drive unit 100 can stop at the final stop position at the time t3 when applied with a brake (by a short brake or a reverse-current brake, etc.). It is advisable that, after the planetary gear 28 of the second drive unit 200 is de-meshed from the gear 6a of the first drive unit 100, the brake be applied to stop the motor 22 of the second drive unit 200.

In the first embodiment, as described above, the direction of rotation of the second drive unit motor is selected to drive the load driving shaft 10s by the combination of driving forces of the first drive unit 100 and the second drive unit 200 and also to drive the first load driving shaft 10s simply by the first drive unit 100.

Next, the second embodiment of this invention will be explained. The second embodiment has two drive units which are independent of each other, each drive unit being capable of driving a load connected to the drive unit and also capable of combining the output of the two drive units to drive one load.

Figure 5:
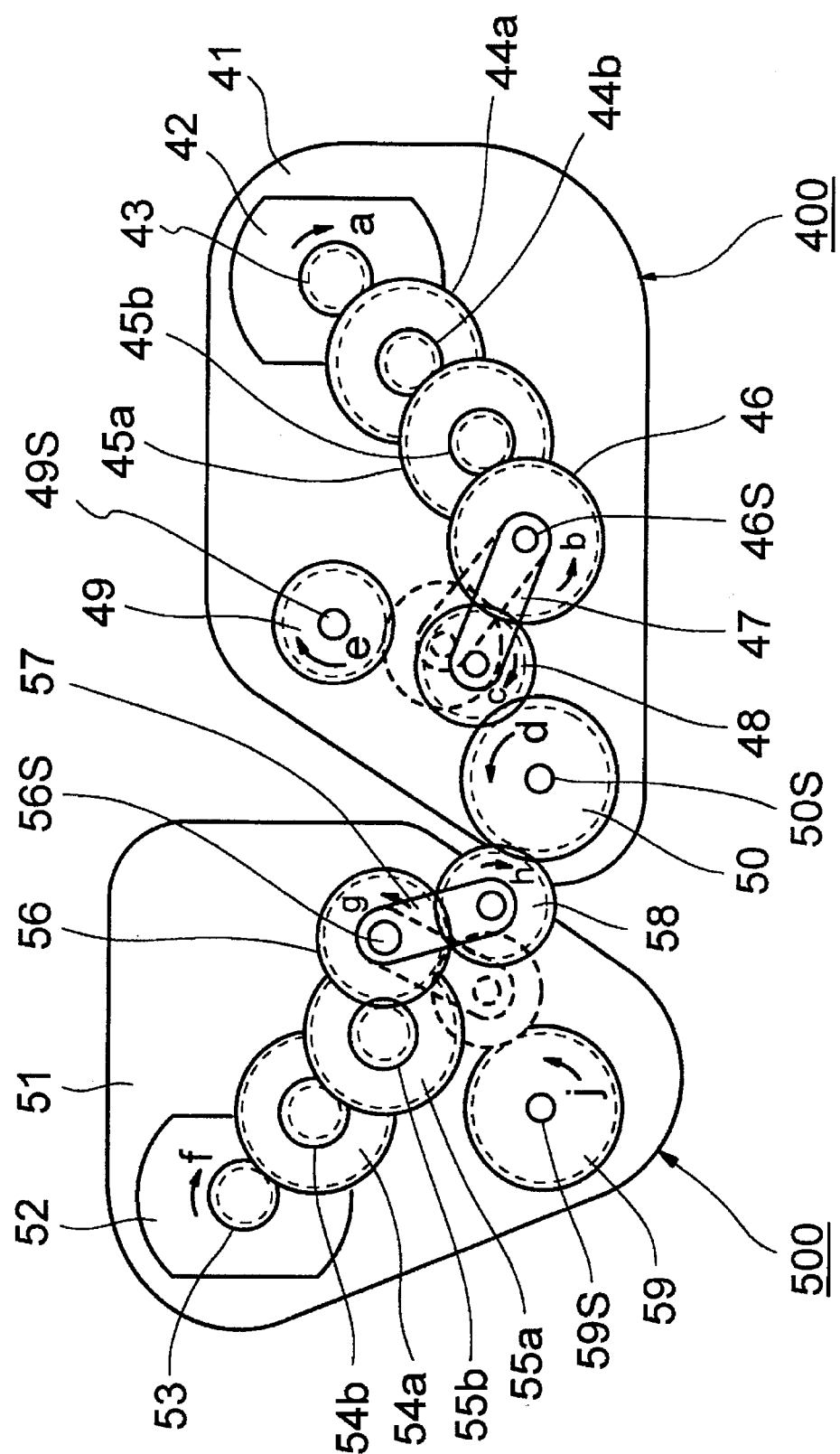
FIG. 5 is a plan view of a gear mechanism in a second embodiment according to this invention.
Figure 6:
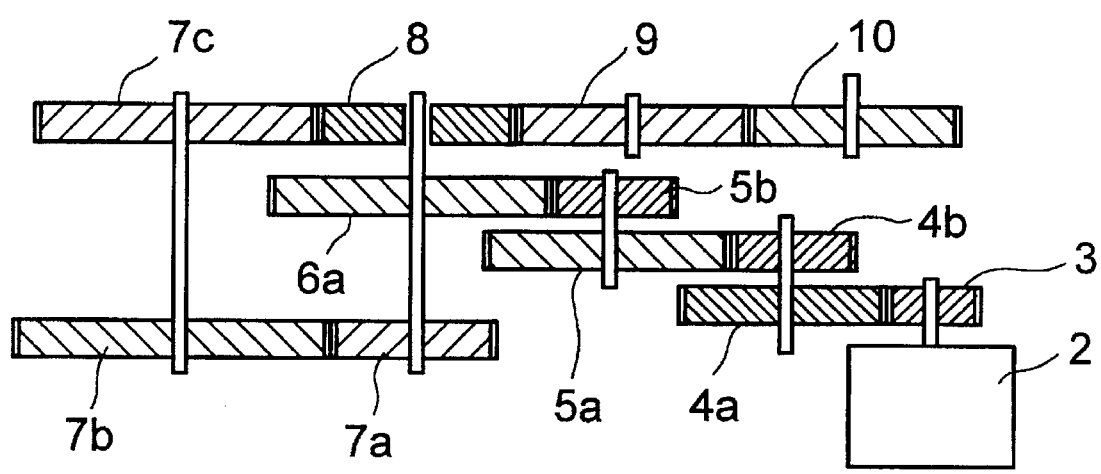
FIG. 6 is a top view of the gear mechanism of FIG. 4.

FIG. 5 is a plan view showing the construction of the gear mechanism of the second embodiment. In FIG. 5, a reference numeral 400 denotes a first drive unit and 500 denotes a second drive unit.

Next explained is the first drive unit 400, in which a numeral 41 is a base plate; 42 is a motor; and 43 refers to a pinion mounted on the driving shaft of the motor 42. A numeral 44a expresses a spur gear in mesh with the pinion 43; 44b is a pinion fixed on the same axis as the spur gear 44a; 45a is a spur gear in mesh with the pinion 44b; and 45b is a pinion fixed on the same axis as the spur gear 45a.

A reference numeral 46 refers to a sun gear in mesh with a pinion 45b; 47 is a carrier rocking about a shaft 46s of the sun gear 46; 48 denotes a planetary gear rotatably mounted in the vicinity of the forward end of the carrier 47, in constant mesh with the sun gear 46, and furthermore in mesh with a load driving shaft gear 50 mounted on a first load driving shaft 50s when the carrier 47 is in the solid-line position in FIG. 5. Also when the carrier 47 is in the dotted-line position in FIG. 5, the planetary gear 48 is in mesh with a load driving shaft gear 49 mounted on a second load driving shaft 49s.

The second drive unit 500 will be explained. A reference numeral 51 is a base plate; 52 denotes a motor; 53 represents a pinion mounted on the driving shaft of the motor 52. 54a denotes a spur gear in mesh with the pinion 53; 54b is a pinion fixedly mounted on the same axis as the spur gear 54a; 55a is a spur gear in mesh with the pinion 54b; and 55b is a pinion fixed on the same axis as the spur gear 55a.

A reference numeral 56 refers to a sun gear in mesh with the pinion 55b; 57 expresses a carrier which rocks about the shaft 56s of the sun gear 56; and 58 refers to a planetary gear rotatably mounted in the vicinity of the forward end of the carrier 57, being constantly meshed with the sun gear 56. The planetary gear 58 meshes with the load driving shaft gear 50 mounted on the first load driving shaft 50s of the first drive unit 400 when the carrier 57 is in the solid-line position in FIG. 5, and meshes with a load driving shaft gear 59 mounted on the third load driving shaft 59s of the second drive unit 500 when the carrier 57 is in the dotted-line position in FIG. 5.

Next, mode operation of the drive units will be explained. First, when the current is supplied to turn the motor 42 of the first drive unit in the direction of the arrow a, the rotation of the motor 42 passes through the pinion 43, the spur gear 44a, the pinion 44b, the spur gear 45a, and the pinion 45b, to rotate the sun gear 46 in the direction of the arrow b, thus rotating the planetary gear 48 in constant mesh with the sun gear 46 in the direction of the arrow c.

The rotation in the direction of the arrow b of the sun gear 46 actuates the carrier 47 to the solid-line position in FIG. 5, where the planetary gear 48 in constant mesh with the sun gear 46 meshes with the load driving shaft gear 50 mounted on the first load driving shaft 50s, thereby rotating the gear 50 in the direction of the arrow d.

In the meantime, when the current is supplied to the motor 52 of the second drive unit 500 to rotate the motor 52 in the direction of the arrow f, the rotation of this motor 52 flows through the pinion 53, the spur gear 54a, the pinion 54b, the spur gear 55a and the pinion 55b to rotate the sun gear 56 in the direction of the arrow g; and therefore the planetary gear 58 in constant mesh with the sun gear 56 rotates in the direction of the arrow h.

With the rotation of the sun gear 56 in the direction of the arrow g, the carrier 57 is moved to the solid-line position in FIG. 5 to move the planetary gear 58 in constant mesh with the sun gear 56 into mesh with the load driving shaft gear 50 which is mounted on the first load driving shaft 50s of the first drive unit 400, thereby rotating the gear 50 in the direction of the arrow d. That is, in this case, the first load driving shaft 50s of the first drive unit 400 is driven by both the first drive unit 400 and the second drive unit 500.

Secondly, when the current is supplied reversely to the motor 42 of the first drive unit 400, the motor 42 is turned in the opposite direction of the arrow a, thus rotating the sun gear 46 in the opposite direction of the arrow b through the pinion 43, the spur gear 44a, the pinion 44b, the spur gear 45a and the pinion 45b. The planetary gear 48 in constant mesh with the sun gear, therefore, is turned in the opposite direction of the arrow c. Also the rotation of the sun gear 46 in the opposite direction of the arrow b moves the carrier 47 to the dotted-line position in FIG. 5. Therefore the planetary gear 48 in constant mesh with the sun gear 46 moves away from the load driving shaft gear 50 which is mounted on the first load driving shaft 50s, into engagement with the load driving shaft gear 49 mounted on the second load driving shaft 49s, thus driving the load driving shaft gear 49.

Furthermore, when the motor 52 of the second drive unit 500 is supplied with the current to turn in the opposite direction of the arrow f, its rotation turns the sun gear 56 in the opposite direction of the arrow g through the pinion 53, the spur gear 54a, the pinion 54b, the spur gear 55a and the pinion 55b; therefore the planetary gear 58 in constant mesh with the sun gear 56 rotates in the opposite direction of the arrow h. Also the rotation of the sun gear 50 in the opposite direction of the arrow g moves the carrier 57 to the dotted-line position in FIG. 5, and therefore the planetary gear 58 in constant mesh with the sun gear 56 is de-meshed from the gear 50 and meshes with the load driving shaft gear 59 mounted on the third load driving shaft 59s, which in turn is driven.

In the second embodiment, as described above, the first, second and third load driving shafts are provided. The driving forces of both the first drive unit and the second drive unit are combined by selecting the direction of rotation of the motors of the first and second drive units, to thereby enable the driving of the first load driving shaft, and besides only the first drive unit is capable of driving the first load driving shaft. Furthermore, it is possible to drive the second and third load driving shafts independently by respective drive units.

The motor drive system of this invention is applicable not only to such precision machines as cameras, copying machines, etc. but to machines in general.

According to this invention, as heretofore described, the motor drive system is composed of the first drive unit and the second drive unit which can be connected to, and disconnected from, the first drive unit. When a great torque is needed when starting and also when high-speed drive is needed in a steady state, both the first drive unit and the second drive unit are combined to drive with a combination of their driving forces. Also, (1) to obtain a better stopping accuracy, (2) to reduce power consumption, and (3) to decrease an operation sound, the first and second drive units are disconnected so that these two drive units may be driven separately.

Therefore the drive unit already designed, for example, the first drive unit, is usable without modifications such as the use of a large-sized motor, alteration of motor characteristics, addition of a reduction mechanism, etc. In this case only the development of a new second drive unit is required, enabling not only the reduction of drive unit development cost but the reduction of manufacturing cost thanks to standardization of the drive unit and the furtherance of commodity development.

As many apparently different embodiments of this invention may be made without departing from the spirit and scope thereof, it is to be understood that the invention is not limited to the specific embodiments thereof except as defined in the appended claims.

What is claimed is:

1. An electric motor drive system comprising:

a first electric motor;

a first drive unit having a load driving shaft which is driven by a driving force of the first electric motor, the first electric motor being mounted in said first drive unit;

a first drive transmission mechanism being mounted in said first drive unit which transmits the driving force of said first electric motor to said load driving shaft;

a second drive unit having a second electric motor;

a second drive transmission mechanism which is mounted in said second drive unit connectable to and disconnectable from said first drive transmission mechanism, to transmit a driving force of said second drive unit to said first drive unit when the second drive transmission mechanism is connected to the first drive transmission mechanism; and a drive controller which disconnects said second drive transmission mechanism from said first drive transmission mechanism to transmit only the driving force of said first drive unit to said load driving shaft when a high torque is not required, and also for connecting said second drive transmission to said first drive transmission mechanism to combine the driving forces of said first and second drive units to effect control when a high starting torque and high-speed drive in a steady state are required, to thereby transmit the combined driving forces to said load driving shaft.

2. An electric motor drive system as claimed in claim 1, wherein said first drive transmission mechanism has a first gear reduction mechanism.

3. An electric motor drive system as claimed in claim 2, wherein said second drive transmission mechanism has a second gear reduction mechanism including an output gear which can be meshed with and de-meshed from said first gear reduction mechanism.

4. An electric motor drive system as claimed in claim 1, wherein said second drive transmission mechanism is so constituted as to switch the connected state and disconnected state to said first drive transmission mechanism by a planetary gear mechanism.

5. An electric motor drive system as claimed in claim 4, wherein said planetary gear mechanism has two states:
    a first state meshing with said first drive mechanism; and
    a second state de-meshing from said first drive transmission mechanism.

6. An electric motor drive mechanism having a load driving shaft, comprising:
    a first electric motor for driving said load driving shaft;
    a first drive transmission mechanism which is provided connectable to and disconnectable from said load driving shaft, and for transmitting a driving force of said first electric motor to said load driving shaft when the first drive transmission mechanism is connected to said load driving shaft;
    a second electric motor for driving said load driving shaft;
    a second drive transmission mechanism having a planetary gear mechanism which is provided connectable to and disconnectable from said load driving shaft, and for transmitting a driving force of said second electric motor to said load driving shaft when the second drive transmission mechanism is connected to said load driving shaft; and
    a drive controller which controls a connected state and a disconnected state of said first drive transmission mechanism and said second drive transmission mechanism to said load driving shaft.

7. An electric motor drive mechanism having a load driving shaft as claimed in claim 6, wherein said drive controller is further constituted so as to transmit the driving force of said second electric motor alone to said load driving shaft.

8. An electric motor drive mechanism having a load driving shaft as claimed in claim 6 wherein said first drive transmission mechanism has a first gear reduction mechanism.

9. An electric motor drive mechanism having a load driving shaft as claimed in claim 6, wherein said first and second drive transmission mechanisms are further constituted so as to transmit the driving force to other driven members than said load driving shaft.

10. A motor drive mechanism having a load driving shaft, comprising:
    a first motor for driving said load driving shaft;
    a first drive transmission mechanism which is connectable to and disconnectable from said load driving shaft, and for transmitting a driving force of said first motor to said load driving shaft when the first drive transmission mechanism is connected to said load driving shaft;
    a second motor for driving said load driving shaft;
    a second drive transmission mechanism which is provided connectable to and disconnectable from said load driving shaft, and for transmitting a driving force of said second motor to said load driving shaft when the second drive transmission mechanism is connected to said load driving shaft;
    a drive control device which controls into two conditions, a first condition in which the driving force of said first motor alone is transmitted to said load driving shaft by said first drive transmission mechanism, and a second condition in which a combination of the driving forces of said first and second motors is transmitted to said load driving shaft by said first and second drive transmission mechanisms; and
    a drive stop device which controls said load driving shaft to the final stop position by the driving force of only one of said first and second motors when said one motor is to be stopped in the second condition in which the driving forces of said first and second motors are combined to drive said load driving shaft.

11. A motor drive mechanism having a load driving shaft as claimed in claim 10, wherein said drive control device is further constituted so as to transmit the driving force of said second motor alone to said load driving shaft.

12. A motor drive mechanism having a load driving shaft as claimed in claim 10, wherein said first drive transmission mechanism has a first gear reduction mechanism.

13. A motor drive mechanism having a load driving shaft as claimed in claim 12, wherein said second drive transmission mechanism has a second gear reduction mechanism including an output gear capable of being connected to and disconnected from said first gear reduction mechanism.

* * * * *